US012480353B2

(12) United States Patent
Ramseyer

(10) Patent No.: US 12,480,353 B2
(45) Date of Patent: Nov. 25, 2025

(54) PROTECTIVE DEVICE FOR AN ELEMENT TO BE SECURED

(71) Applicant: Frédéric Ramseyer, Courtedoux (CH)

(72) Inventor: Frédéric Ramseyer, Courtedoux (CH)

( * ) Notice: Subject to any disclaimer, the term of this patent is extended or adjusted under 35 U.S.C. 154(b) by 226 days.

(21) Appl. No.: 18/256,051

(22) PCT Filed: Jun. 17, 2021

(86) PCT No.: PCT/EP2021/066338
§ 371 (c)(1),
(2) Date: Jun. 29, 2023

(87) PCT Pub. No.: WO2022/122191
PCT Pub. Date: Jun. 16, 2022

(65) Prior Publication Data

US 2024/0062631 A1 Feb. 22, 2024

(30) Foreign Application Priority Data

Dec. 7, 2020 (CH) .................................... 01548/20

(51) Int. Cl.
*E05G 7/00* (2006.01)
*E05G 5/00* (2006.01)
*G07F 19/00* (2006.01)

(52) U.S. Cl.
CPC ............... *E05G 7/004* (2013.01); *E05G 5/00* (2013.01); *E05G 7/00* (2013.01); *G07F 19/205* (2013.01)

(58) Field of Classification Search
CPC .. E05G 1/00; E05G 1/02; E05G 1/026; E05G 1/10; E05G 5/00; E05G 5/003; E05G 5/02; E05G 7/00; E05G 7/002; E05G 7/004; G07F 19/205
See application file for complete search history.

(56) References Cited

U.S. PATENT DOCUMENTS 983,663 A * 2/1911 White ........................ E06B 9/88 160/90
4,235,491 A * 11/1980 Korber .................... E05G 5/006 312/297
4,418,628 A * 12/1983 Cahill ..................... E05G 7/005 109/19
4,921,033 A * 5/1990 Finch ........................ E06B 9/13 160/264

(Continued)

FOREIGN PATENT DOCUMENTS

CN 206 409 100 U 8/2017
DE 84 31 086 U1 1/1986

(Continued)

*Primary Examiner* — Christopher J Boswell
(74) *Attorney, Agent, or Firm* — Leydig, Voit & Mayer, Ltd.

(57) ABSTRACT

A protective device for protecting an element that is to be made more secure includes: a cage forming a frame for bearing against a support surrounding the element that is to be secured, the cage including fixing and/or anchoring means for attaching the cage to the support; inside the cage, at least a first shutoff means for shutting off the element that is to be made more secure; and security systems to be triggered upon an attack made on the first shutoff means. The first shutoff means is reinforced with several distinct materials.

20 Claims, 4 Drawing Sheets

(56) References Cited

U.S. PATENT DOCUMENTS

| | | | | |
|---|---|---|---|---|
| 5,295,743 | A * | 3/1994 | Moulton | E06B 9/115<br>312/297 |
| 9,070,245 | B2 * | 6/2015 | Go | G07D 11/125 |
| 9,702,665 | B1 * | 7/2017 | Rose, Jr. | E06B 9/13 |
| 2010/0181029 | A1 * | 7/2010 | Miller | E06B 9/17<br>160/133 |
| 2013/0276679 | A1 * | 10/2013 | Kroeplien | E05G 1/026<br>211/13.1 |
| 2016/0230444 | A1 * | 8/2016 | Hahn | F41H 5/24 |

FOREIGN PATENT DOCUMENTS

| | | | |
|---|---|---|---|
| FR | 2 406 057 | A1 | 5/1979 |
| FR | 2 808 914 | A1 | 11/2001 |
| GB | 2003223 | A | 3/1979 |
| WO | WO 9720119 | A1 | 6/1997 |

* cited by examiner

PROTECTIVE DEVICE FOR AN ELEMENT TO BE SECURED

CROSS-REFERENCE TO PRIOR APPLICATIONS

This application is a U.S. National Phase application under 35 U.S.C. § 371 of International Application No. PCT/EP2021/066338, filed on Jun. 17, 2021, and claims benefit to Swiss Patent Application No. CH 01548/20, filed on Dec. 7, 2020. The International Application was published in French on Jun. 16, 2022 as WO/2022/122191 under PCT Article 21(2).

FIELD

The present invention relates to a protective device intended to make more secure an element such as a cash machine.

BACKGROUND

Making automatic cash machines more secure addresses a current and fundamental need in protecting and preventing damage to buildings that house such devices. Attacks using explosives, gas, ramraiding vehicles, and a ripping out method called the lasso method cause damage that is irreversible and financially unsustainable for the owners of organizations that house such devices. Over recent years there have been waves of explosive attacks, inflicting considerable damage on the buildings connected and adjacent to the machines. It is therefore a major and urgent, if not to say immediate, need to address, impede, delay and prevent these major thefts phenomena by installing protective devices that prevent all kinds of attack, such as by sawing, cutting, drilling and explosion on automatic cash machines.

There are several documents in the prior art that disclose devices for limiting such attacks.

Thus, document FR 2 808 914 discloses an interactive terminal equipped with protective means comprising a shutter and with retraction means that move the terminal away from the public.

Document CN 206 409 100 discloses a rear window of a bank office that is equipped with a shutoff shutter and with a series of blast proof panes which are stacked and fixed in a pivoting manner relative to the frame of the window.

Document DE 84 31 086 U1 discloses a security device for coin machines comprising a shutoff shutter and a container inside which the coin machine is housed.

SUMMARY

In an embodiment, the present invention provides a protective device for protecting an element that is to be made more secure, the protection device comprising: a cage forming a frame configured to bear against a support surrounding the element that is to be secured, the cage comprising fixing and/or anchoring means configured to attach the cage to the support; inside the cage, at least a first shutoff means configured to shut off the element that is to be made more secure; and security systems configured to be triggered upon an attack made on the first shutoff means, wherein the first shutoff means is reinforced with a plurality of distinct materials.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a protective device resistant to all types of attack, damage and external vandalism.

In an embodiment, the present invention provides a protective device for an element that is to be made more secure, said protective device comprising a cage forming a frame intended to rest against a support surrounding the element that is to be made more secure, said cage comprising fixing or anchoring means which in use serve to attach it to the support. Said protective device further comprises at least a first plate or a first shutter intended to shut off the element that is to be made more secure, said first plate or said first shutter being positioned inside the cage. The protective device further comprises security systems able to be triggered in the event of an attack on the first plate or on the first shutter.

The first shutter or the first plate are made with at least two distinct materials able to combine the different properties of materials to obtain a shutter or a plate that is insensitive to impact, to drilling, to cutting, to explosions, etc.

The cage, which is preferably made of a metal material, is permanently fixed to the façade and preferably also to the ground. Advantageously, it is mounted on an elastic suspension so that it can absorb impacts and vibrations. It forms a first protective barrier with no point of purchase for attaching a winch for ripping out the element that is to be secured.

Next, the first shutter or the first plate offers a second security barrier with a combination of materials that will improve resistance to all types of attack. Furthermore, violation of the shutter or of the plate will trigger a series of security systems that will allow the security forces to rapidly intervene.

To finish, the protective device preferably comprises a second shutter or a second plate after the first shutter or the first plate and which is a final obstacle to accessing the element that is to be made more secure.

Further features and advantages of the present invention will become apparent from the following description of one preferred embodiment, given by way of nonlimiting example with reference to the attached drawings.

The present invention relates to a protective device intended to make more secure an element such as a cash machine, a door, a window, etc.

Figure 1:
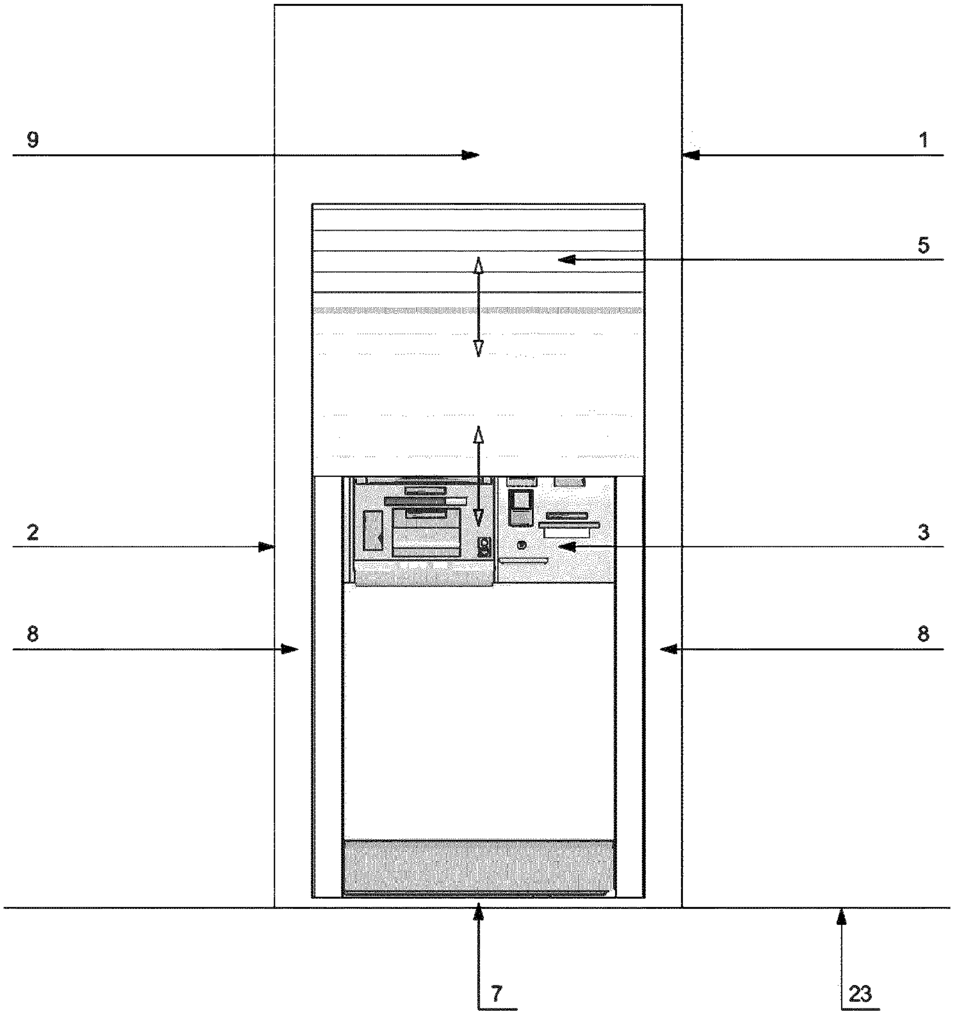
FIG. 1 depicts a simplified face-on view of the element that is made more secure, equipped with the protective device according to the invention.
Figure 2:
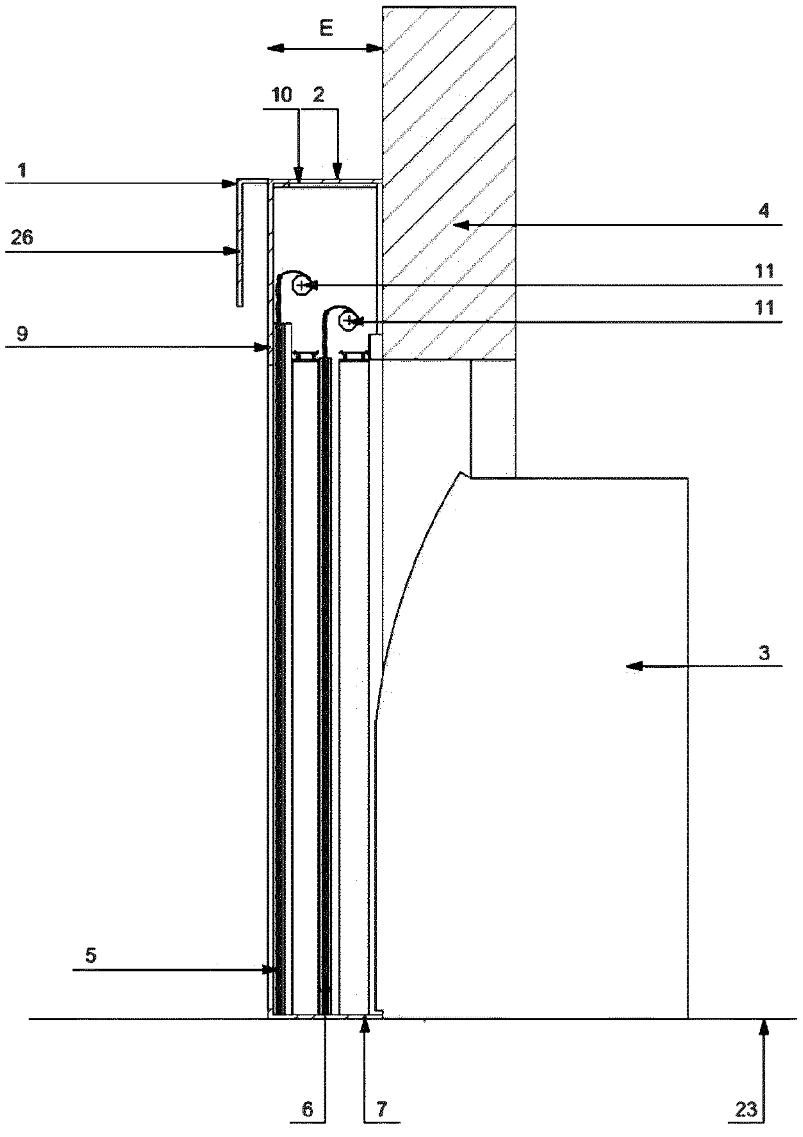
FIG. 2 depicts a view in vertical section of FIG. 1.

By way of example, the invention is illustrated hereinafter in the case of a protective device 1 that provides additional security for a cash machine 3 (FIG. 1 and FIG. 2). According to the invention, the protective device 1 comprises a cage 2 intended to be placed against a support 4 surrounding the element that is to be made more secure. In the case of the example illustrated, this is the façade of a building housing the element that is to be made more secure. It could also be a wall surrounding the door or the window that is to be made more secure, etc.

Figure 3:
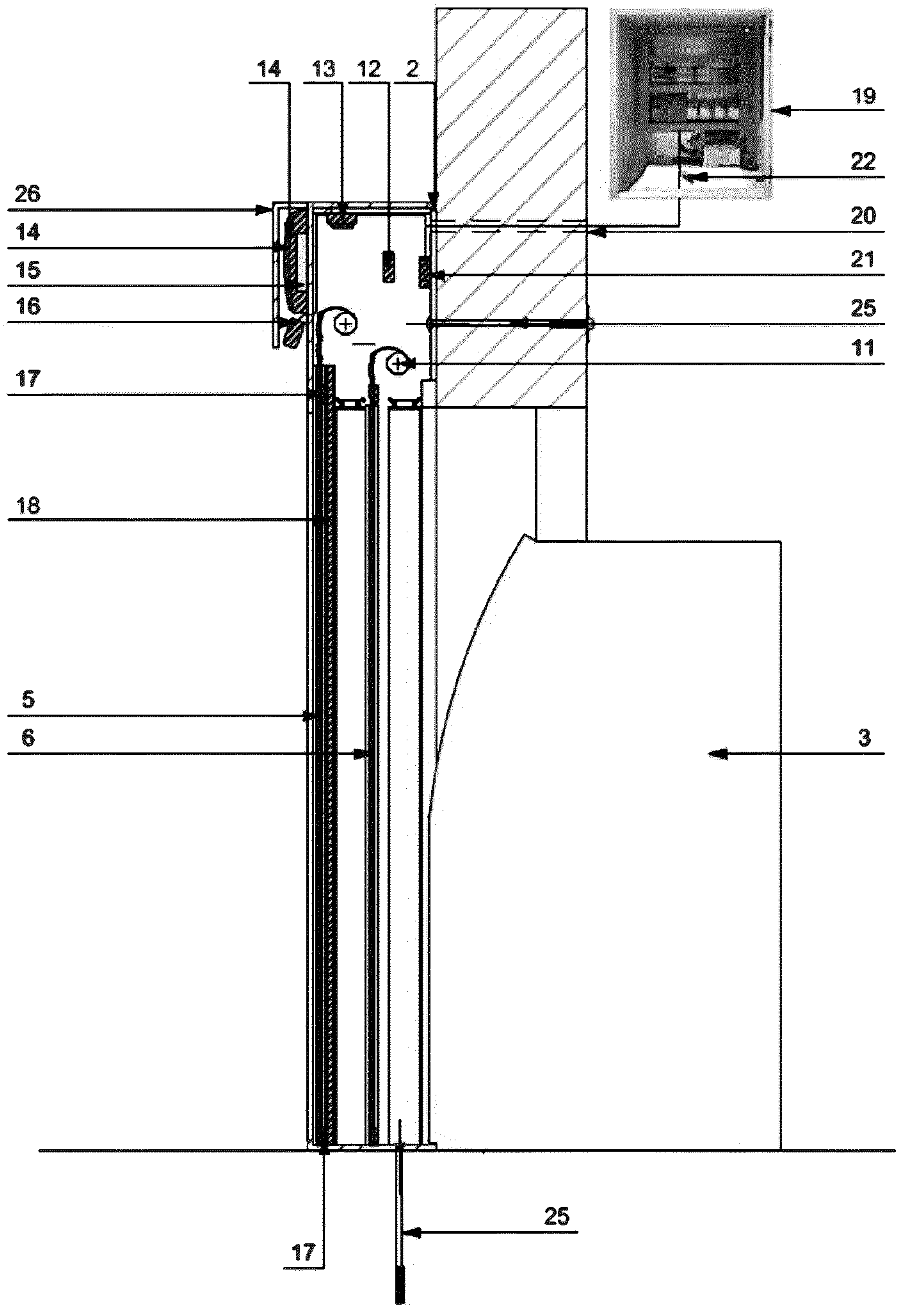
FIG. 3 depicts a more detailed view in vertical section of the element that is to be made more secure equipped with the protective device according to the invention.

The protective device 1 according to the invention comprises the cage 2, preferably made from a metal, shutoff means for shutting off the element that is to be made more secure, such as roller shutters 5 and 6 or sliding plates (variant not depicted) and security systems such as sirens 14, camera 16, etc. (FIG. 3).

The cage 2 forms a frame on the outside of the façade 4. The frame has a thickness E with respect to the façade comprised between 15 and 60 cm, preferably between 30 and 50 cm. As a preference, the cage 2 rests on a base 23 which may be the ground. It comprises a baseplate 7 connecting two vertical profiles 8 which are themselves connected in their upper parts to a pediment 9 pressing against the façade 4 of the building at its top via a plate 10. The vertical profiles, the baseplate and the pediment may be respectively one-piece elements or made up of several parts welded or screw-fastened together. As a preference, the baseplate 7 rests on the ground and is mounted on an elastic suspension (not depicted). The baseplate 7 may be fixed to the ground with fixing means 25 such as anti-theft security bolts (FIG. 3). The cage may also be fixed to the façade of the building via the drilled profiles and fixing means 25 such as threaded rods passing through the façade or else sealed directly into the façade at the time of construction of the building. As a preference, the cage is fixed to the ground and to the façade.

Figure 4:
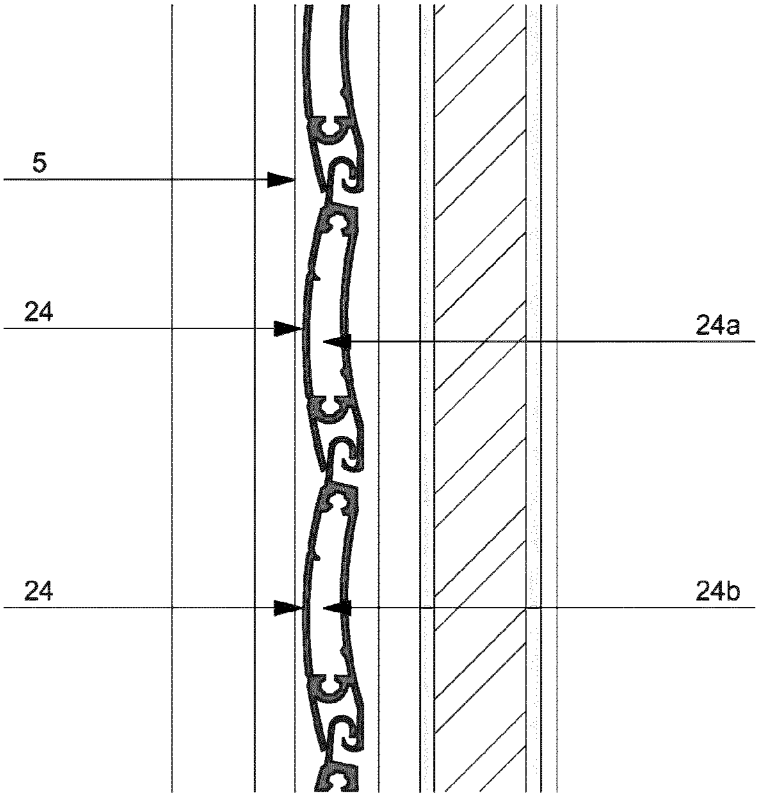
FIG. 4 depicts a detailed view in vertical section of one of the shutters that shuts off the element that is to be made more secure.

The protective device comprises the one or two shutters or, as a variant, the one or two plates. The protective device is described hereinafter in the case of shutters but the features described also apply to the case of plates. The protective device comprises at least one shutter. As a preference, the protective device comprises two roller shutters one of which is referred to as the rear shutter 6 and the other the front shutter 5, the position being rear as opposed to the front position in proximity to the pediment. The shutters 5, 6 are positioned and deployed in the space delimited by the cage 2 and the façade 4 of the building. They are operated by electric motors 11 placed behind the pediment 9 in the example illustrated. At least the front shutter is produced using at least two distinct materials resistant to different types of attack (cutting, drilling, sawing, explosion, ram-raiding, etc.). As a preference, both of the two shutters are produced with at least two distinct materials resistant to the various types of attack. As a preference, the two shutters are made up of extruded slats 24, for example made of aluminum, which are hollow (FIG. 4). The slats 24 are filled with different materials 24*a*, 24*b* to reinforce them. As a preference, there is just one material per slat. The different materials are distributed in alternation in the succession of slats with either a successive series comprising a first material followed by another successive series of the other material and so on for the other materials, or with a random distribution of the various materials in the slats. The materials are, for example, selected from among mineral materials such as cement, ceramic materials such as carbides, oxides and nitrides, composite materials such as cermets, polymer materials such as poly(p-phenyleneterephthalamide) also known as Kevlar® and metallic materials such as a steel with high energy capacity, for example the steel 1.3401 ENX120Mn12, and a stainless steel that has good impact resistance, for example the steel K700. In this way, the shutters can be produced using 2, 3, 4, 5 distinct materials distributed through the slats of each shutter. Where there are two shutters, at least the front shutter comprises this succession of at least two different materials, it being possible for the rear shutter to be produced using just one of these materials. In the roll-down position, the shutters come into abutment with the baseplate. For the variant having one or two plates comprising slats, these may slide vertically up or down or laterally in the direction perpendicular to the two vertical profiles.

The protective device further comprises a series of security systems 12-18 placed behind the pediment 9, behind a cover 26 positioned in front of the pediment 9, between the two shutters 5, 6 or behind the shutter 5 when there is just one shutter. The security systems may further be hidden by removable metal components fixed by antitheft security nuts that cannot be sabotaged or damaged by hand or with any other object. The security systems may be selected from the following list (FIG. 3):

- impact and vibration detector 12, for example positioned behind the pediment 9,
- fire detector 13, for example positioned behind the pediment 9,
- siren with flashing light 14 and high-decibel siren 14, these for example being positioned behind the cover 26,
- DNA anti-intrusion spray (SelectaDNA aerosol) 15, for example positioned behind the cover 26,
- camera 16, for example positioned behind the cover 26,
- anti-sabotage contact & reversing contact 17, these for example being positioned behind the shutters 5, 6,
- IR barriers (beams of parallel rays) 18, for example positioned behind the front shutter 5.

The protective device also comprises a series of elements providing a supply of power and computer connections between the security systems and a control cabinet 19 via a drilling 20, such as a transponder switch 21 and a male and female contact 22. According to the invention, the security shutters and systems are controlled by the control cabinet inside the building. Smartphone control and remote control via a secure private Wi-Fi network are also possible.

In use, the front shutter rolls down in a few seconds and comes into abutment against the baseplate. The motors press and force the shutter so that it is impossible to raise it back up. Internal protection inside the blind actuating device will physically prevent any raising of the slats and provide high resistance to raising. An end-of-travel end stop will send a shutter-locked message to a central security unit. The rear shutter will unroll in the same space of time and lock according to the same pattern as the first.

In the event of violation, drilling, sawing, explosion of the front shutter several of the security systems will come into action. Amongst others, a light barrier 18 is triggered. At the same time, a flash of light and a high-decibel siren 14 come into action. The autonomous central security unit is thus alerted and calls the police or other organization licensed to protect the population's property. In the event of a ramraid attack by a vehicle, an impact and seismic protection system 12, set to a suitable level of sensitivity, will also trigger a flash of light and sirens. It is impossible to gain purchase with a lasso or strap in order to attempt to rip the protective device out because there are no gaps or protruding elements to provide purchase for attaching any pulling means.

Finally, it will be specified that, in the variant with the shutters or plates mounted with the ability to move, the protective device may comprise one or more fixed plates permanently shutting off the element that is to be made more secure, openings then being formed in the plate or plates in order to provide access to the keypad and the cash dispensing outlet in the case of an automatic cash machine.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

KEY

- (1) protective device
- (2) cage
- (3) element to be made more secure or cash machine
- (4) building façade or support
- (5) first shutoff means, also referred to as first shutter or plate, also referred to as front shutter or plate
- (6) second shutoff means, also referred to as second shutter or plate, also referred to as rear shutter or rear plate
- (7) baseplate
- (8) vertical profile
- (9) pediment
- (10) pediment top plate
- (11) shutter motor
- (12) impact and vibration detector
- (13) fire detector
- (14) sirens
- (15) DNA anti-intrusion spray (SelectaDNA aerosol)
- (16) camera
- (17) anti-sabotage contact & reversing contact
- (18) IR barriers (beams of parallel rays)
- (19) control cabinet
- (20) drilling
- (21) transponder switch
- (22) male and female connector
- (23) base
- (24) slat
  - a. first material inside a slat
  - b. second material inside another slat
- (25) fixing means
- (26) cover E: thickness between the pediment 9 and the support 4

The invention claimed is:

1. A protective device for protecting an element that is to be made more secure, the protection device comprising:

a cage forming a frame configured to bear against an outside of a support surrounding the element that is to be secured, the cage comprising fixing and/or anchoring means configured to attach the cage to the support;

inside the cage, at least a first shutoff means configured to shut off the element that is to be made more secure, and configured to be positioned and deployed in a space delimited by the cage and the outside of the support; and security systems configured to be triggered upon an attack made on the first shutoff means, wherein the first shutoff means is reinforced with a plurality of distinct materials.

2. The protective device of claim 1, further comprising:

a second shut off means configured to shut off the element that is to be made more secure, the second shut off means being positioned following the first shutoff means in a direction of the support.

3. The protective device of claim 2, wherein the second shutoff means comprises the series of hollow slats.

4. The protective device of claim 3, wherein the first and second shutoff means each comprise roller shutters or sliding plates.

5. The protective device of claim 4, wherein the first shutoff means comes into abutment against the baseplate when the first shutoff means shuts off the element that is to be made more secure.

6. The protective device of claim 1, wherein the first shutoff means comprises a series of hollow slats, each slat of the series of slats being filled with the distinct materials in order to provide resistance against different types of attack such as cutting, drilling, sawing, explosion and ramraiding.

7. The protective device of claim 6, wherein there is only one material per slat.

8. The protective device of claim 7, wherein the distinct materials are distributed in successions of series of a one same material in the slats.

9. The protective device of claim 1, wherein the distinct materials comprise four distinct materials.

10. The protective device of claim 1, wherein the distinct materials are selected from a group comprising metal alloys, ceramics, cermets, polymers, and minerals.

11. The protective device of claim 10, wherein the distinct materials are selected from a group comprising steel, poly (p-phenyleneterephthalamide), and cement.

12. The protective device of claim 1, wherein the cage comprises a baseplate connecting two vertical profiles, the vertical profiles being connected in upper parts thereof to a pediment which presses, at a top thereof, against the support via a plate.

13. The protective device of claim 12, wherein the baseplate rests on ground delimiting the support.

14. The protective device of claim 13, wherein the baseplate comprises the fixing means providing attachment to the ground.

15. The protective device of claim 12, wherein the anchoring means comprise a portion of the two vertical profiles configured to be sealed into the support.

16. The protective device of claim 1, wherein the cage has a thickness relative to the support of between 15 and 60 cm.

17. The protective device of claim 1, wherein the security systems are selected from a group comprising an IR barrier, an impact and vibration detector, a fire detector, a siren, an anti-sabotage contact, a camera, and a DNA anti-intrusion spray.

18. The protective device of claim 17, wherein the security systems are placed behind a pediment, behind a cover placed in front of the pediment in a position external to the cage, and/or behind the first shutoff means.

19. An element to be made more secure, comprising:

the protective device of claim 1.

20. The element to be made more secure of claim 19, wherein element to be made more secure comprises an automatic cash machine.

* * * * *